INVENTORS.
FOSTER E. WELD,
ROBERT W. LASSELL &
ROBERT B. McLEOD
BY Tilberry & Body
ATTORNEYS COMBINED TELEPHONE-TELEGRAPHY SYSTEM WHEREIN LOCAL CALLING BOX INCLUDES TELEPHONE EQUIPMENT AND TELEGRAPHY TRANSMITTER Filed Oct. 12, 1964

*INVENTORS.*
FOSTER E. WELD,
ROBERT W. LASSELL &
ROBERT B. McLEOD
BY Tilberry & Body
ATTORNEYS INVENTORS.
FOSTER E. WELD,
ROBERT W. LASSELL &
ROBERT B. McLEOD
BY Tilberry & Body
ATTORNEYS INVENTORS.
FOSTER E. WELD,
ROBERT W. LASSELL &
ROBERT B. McLEOD
BY Tilberry & Body
ATTORNEYS United States Patent Office 3,384,714
Patented May 21, 1968

3,384,714

COMBINED TELEPHONE-TELEGRAPHY SYSTEM WHEREIN LOCAL CALLING BOX INCLUDES TELEPHONE EQUIPMENT AND TELEGRAPHY TRANSMITTER

Foster E. Weld, Newton Highlands, Robert W. Lassell, Westwood, and Robert B. McLeod, Clinton, Mass., assignors to E. W. Bliss Company, Canton, Ohio
Filed Oct. 12, 1964, Ser. No. 403,316
14 Claims. (Cl. 179—3)

ABSTRACT OF THE DISCLOSURE

A combined telephone-telegraphy system is disclosed herein and which includes a plurality of local calling boxes and central station communication equipment connected together in a series circuit. Each local calling box includes telephone equipment for transmitting and receiving voice frequency signals to and from the central station equipment, as well as telegraphy means for transmitting coded box, identifying tone frequency signals to the central station equipment. Each local calling box also includes means for providing electrical power for the local calling box from current flow in the series circuit. The central station equipment includes telephone equipment for transmitting and receiving voice frequency signals to and from the local calling boxes, as well as means responsive to the coded box identifying tone frequency signals for identifying the particular box transmitting the coded box identifying signal.

This invention pertains to the art of communications and more particularly to a combined telephone-telegraphy communication system.

The invention is particularly applicable in conjunction with fire alarm and police call systems and will be described with particular reference thereto, but is not limited to same as it may be used for various applications in which combined telephone and telegraphy communications are desired.

A typical fire alarm system takes the form of a series loop connecting various boxes, i.e., local fire alarm boxes, together in a current carrying series circuit with central office equipment. A fire alarm call may be sent from each of the series connected boxes to the central station by merely actuating a lever at the box, which in turn actuates a suitable signaling device, which interrupts the current flow in a distinctive manner representative of the calling box.

Frequently it is desirable that in addition to the distinctive signal identifying the signaling box, a telephone capability be provided between the calling box and the central station in order that a person reporting a fire may communicate by voice with the fire department personnel to, for example, explain the extent of the fire. Also, if such a combined telephone-telegraphy fire alarm system be provided it is desirable that a distinctive coded signal identifying the calling box have priority, i.e., be received first, over voice communication so that the voice communications will never interfere with or delay fire alarm reception. Further, due to the time proven reliability of conventional series connected fire alarm boxes, it is desirable that such a telephone-telegraphy fire alarm system utilize wherever possible the existing wire facilities thereby alleviating the necessity of installing new metallic interconnecting circuits.

In addition to the foregoing reasons for improving fire alarm systems, municipalities also find it desirable to utilize existing fire alarm circuits for police call reporting systems. That is, it may be desirable for a patrolman to utilize a telephone located at a fire alarm box for reporting to police headquarters over a municipally owned communication network.

The present invention is directed toward means for satisfying the foregoing needs of municipalities, as well as others who desire a combined telephone-telegraphy system.

In accordance with the present invention there is provided a combined telephone-telegraphy system including a plurality of local calling boxes and central station equipment connected together in a series circuit and adapted to be connected across a power supply source for maintaining current flow in the series circuit. Each of the local calling boxes includes voice communication means for transmitting and receiving voice frequency signals to and from the central station equipment, as well as telegraphy means for transmitting coded box identifying frequency signals to the central station equipment. The central station equipment includes voice communication means for transmitting and receiving voice frequency signals to and from the local calling boxes, as well as calling box identifying means responsive to the coded box identifying frequency signals for identifying the particular calling box transmitting the coded box identifying signals. In addition, each of the local calling boxes includes circuit means for providing operating power for the box from the current flowing in the series circuit.

In accordance with another aspect of the present invention, there is provided a novel calling box including communication means for transmitting and receiving voice frequency signals, as well as telegraphy means for transmitting coded box identifying signals. In addition, circuit means are provided in the calling box adapted to be connected to a current carrying conductor for developing box operating power therefrom. The circuit means may include power supply means for developing bias potential for supplying bias potential to the voice communication means, as well as to the telegraphy means.

In accordance with a still further aspect of the present invention, normally closed switching means are provided for shunting the circuit means in said local calling box thereby rendering the circuit means nonresponsive to current flow in the conductor until the switching means is opened. Further, said circuit means may include a Zener diode connected across the normally closed switching means in such a manner with respect to the direction of the current flow in the conductor that when the switching means is opened the Zener diode will be reversed biased.

In accordance with a still further aspect of the present invention, the telegraphy means within each box includes oscillator means for developing a coded frequency signal representative of the calling box. In addition, the calling box may include the time delay circuit means for de-activating the oscillator means after a predetermined time subsequent to the opening of the normally closed switching means whereby the coded frequency signal is transmitted for a predetermined period.

In accordance with a still further aspect of the present invention, the calling box includes common power amplifying means for amplifying the output of the voice communication transmitting means, as well as the output of the telegraphy means.

In accordance with a still further aspect of the present invention, novel central station equipment means are provided adapted for use in receiving coded box identifying frequency signals from a plurality of calling boxes and identifying which calling box transmitted the coded box identifying signals. The central station equipment means includes voice communication means for transmitting and receiving voice frequency signals, as well as calling box identifying means responsive to receive coded box identifying frequency signals for identifying which calling box transmitted coded box identifying signals. Still further, the central station equipment means includes signal separation circuit means for purposes of separating received voice frequency signals from the coded box identifying frequency signals and respectively coupling the signals to the central station voice communication means and to the calling box identifying means.

In accordance with a still further aspect of the present invention, the box identifying means in the central station equipment means includes a plurality of decoder means each responsive to a particular frequency within a frequency range of signals passed by a band pass filter means included in the signal separation circuit means for purposes of providing an output decoder signal.

In accordance with a still further aspect of the present invention, the central station equipment means includes logic circuit means responsive to various combinations of the output decoder signals for determining which local calling box is transmitting coded box identifying frequency signals.

The primary object of the present invention is to provide a combined telephone-telegraphy communication system which is simple in construction and economical to manufacture.

Another object of the present invention is to provide a combined telephone-telegraphy system which operates with a single wire circuit thereby rendering it easy for installation and maintenance.

A still further object of the present invention is to provide a telephone-telegraphy communication system for fire alarm systems in which coded fire alarm signals carry priority over voice communications so that the voice communications never interfere with or delay fire alarm reception.

A still further object of the present invention is to provide a combined telephone-telegraphy system which may be easily added to existing fire alarm circuits for a small additional cost.

A still further object of the present invention is to provide a combined telephone-telegraphy system which may be used in conjunction with a fire alarm circuit for providing a police call system utilizing the existing facilities of a fire alarm system.

A still further object of the present invention is to provide in a fire alarm system a telephone-telegraphy system in which each of the fire alarm boxes is provided with telephone capabilities and in which upon removal of the telephone handset from its cradle an indication of the box location is displayed at the central station of the fire alarm system.

These and other objects and advantages of the invention will become apparent from the following description of the preferred embodiment of the invention as read in connection with the accompanying drawings in which.

Figure 1:
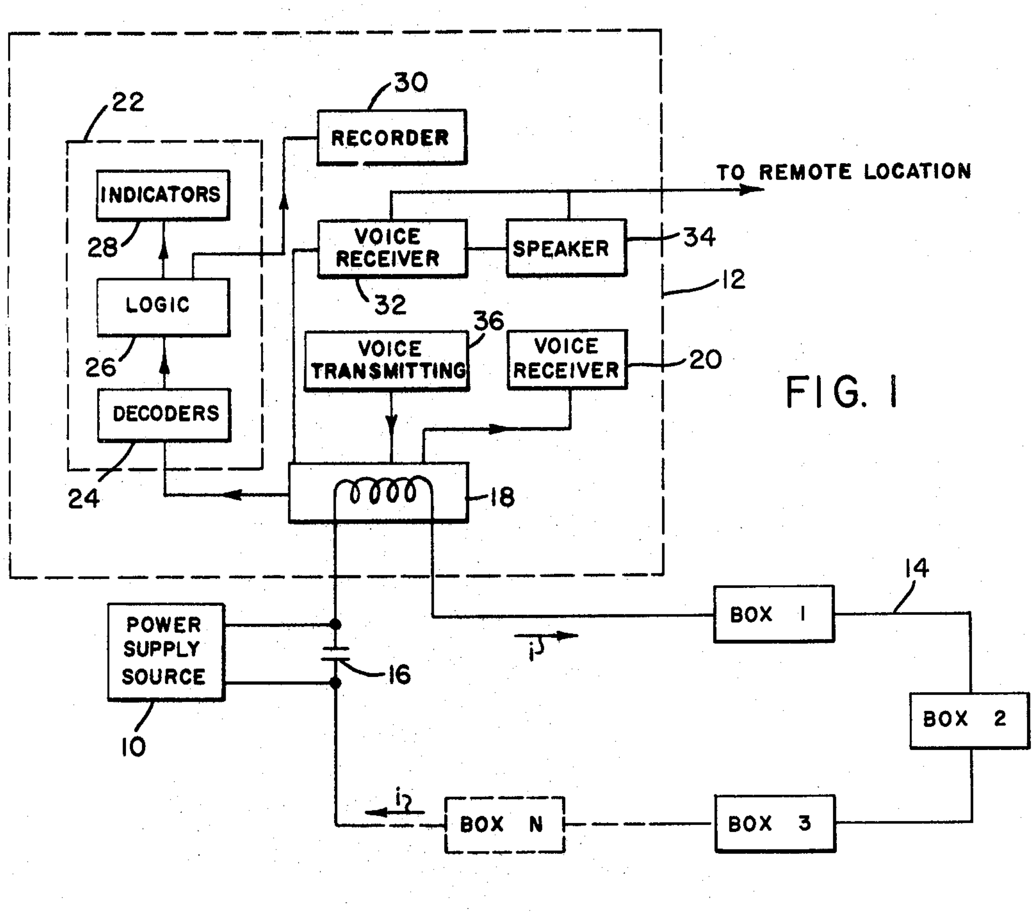
FIGURE 1 is a system block diagram illustrating a plurality of series connected fire alarm boxes and a central station.

Referring now to the drawings and more particularly to FIGURE 1, there is illustrated in block diagram form one preferred embodiment of the invention as applied to a fire alarm system including a plurality of local fire alarm boxes 1, 2, 3 through N, connected together in series across a central station power supply source 10 via central station equipment 12. The central station power supply source 10 and station equipment 12 may be located, for example, at the fire department headquarters and the various local boxes 1 through N at desired locations within the fire alarm system. Although new equipment may be utilized it is within the contemplation of the present invention that the fire alarm boxes 1 through N represent existing equipment within a fire alarm system connected together in series by means of a single metallic circuit 14 in which direct current flows in accordance with the arrows illustrated in FIGURE 1, having a constant value in the order of 100 milliamperes supplied by the power supply source 10. As will be described in greater detail hereinafter, each of the local fire alarm boxes 1 through N includes means for transmitting a distinctive complex frequency signal, identifying the particular box to the central office equipment 12, as well as means for transmitting voice frequencies from the box to the central office equipment 12. A capacitor 16 is connected across the power supply source 10 to prevent the coded and voice frequency signals from being coupled to the power supply source and its related central station equipment. The central station equipment 12 connected in series with the fire alarm boxes 1 through N includes signal separator circuitry 18 which serves to separate the received voice frequency signals from the received coded distinctive frequency signals. The voice frequency signals are coupled to a voice receiver 20 and the coded frequency signals are coupled to box identifying equipment 22. The box identifying equipment 22 includes a plurality of decoders 24 for decoding the received coded signal and applying the output thereof to suitable logic circuitry 26, which in turn serves to energize an appropriate indicator among the indicators 28 for identifying the calling box, as well as to provide an output signal to accessory equipment, such as a recoder 30 for purposes of recording which box placed a call. In addition, the signal separator circuitry 18 serves to supply an output signal to energize suitable equipment 32 for purposes of transferring the voice communications to a remote location via suitable calling equipment 34. The central station equipment 12 also includes voice transmitting means 36 for purposes of providing two way voice communications with the calling box.

LOCAL FIRE ALARM BOXES

Figure 2:
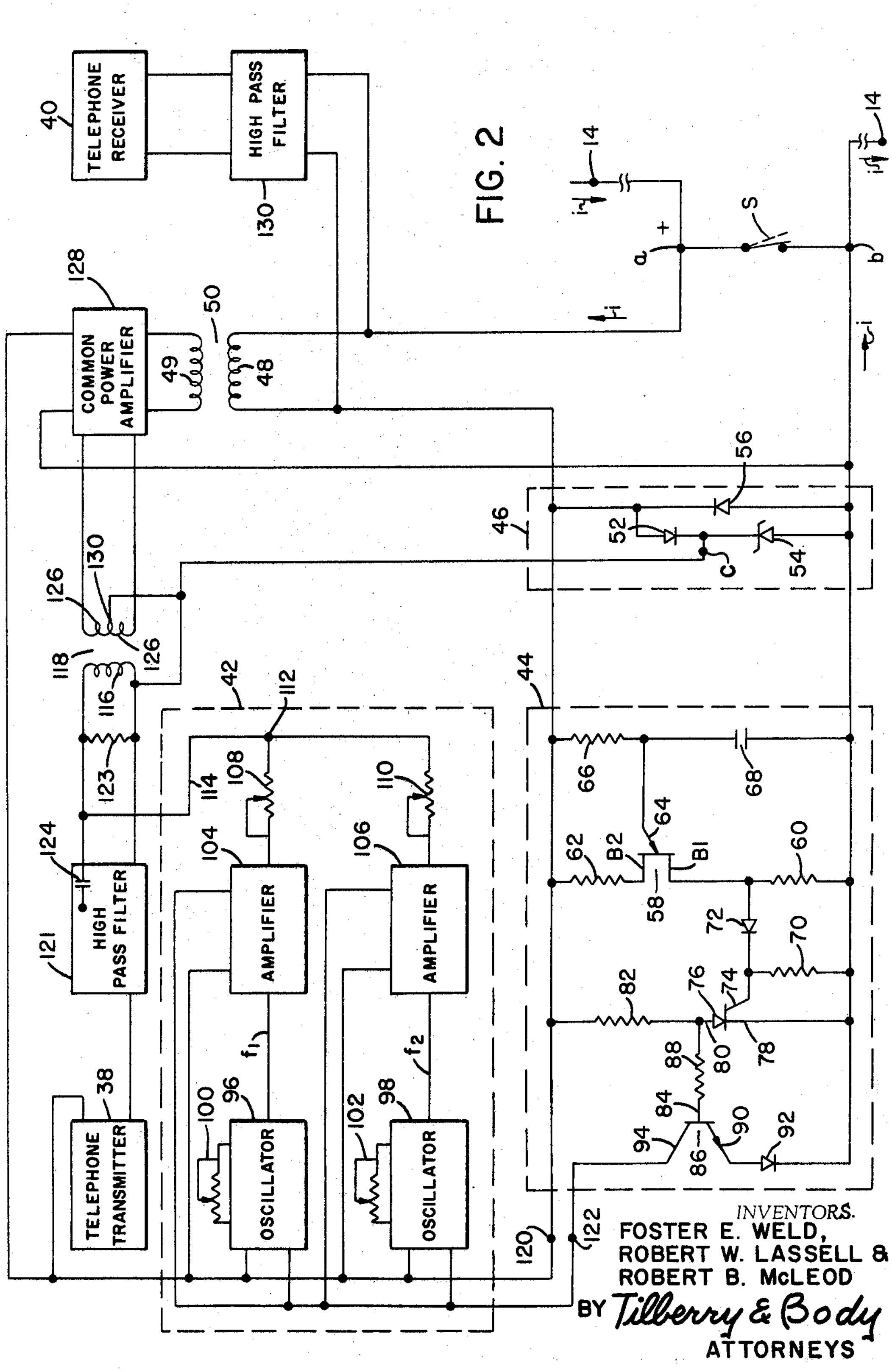
FIGURE 2 is a combined schematic block diagram illustrating the circuitry within each of the fire alarm boxes.

Having briefly described the general arrangement of the inventive telephone-telegraphy system according to the present invention, attention is now directed toward the equipment included within each of the various local fire alarm boxes 1 through N as illustrated in FIGURE 2. Each of the local fire alarm boxes includes telephone equipment for voice communication with the central station 12, as well as coded telegraphy equipment for sending a coded distinctive signal identifying the box to the central station 12. The telephone capabilities include a conventional telephone transmitter 38 and a conventional telephone receiver 40. The coded telegraphy equipment within each box includes an encoding unit 42 and a time delay circuit 44 which serves to provide power to the encoding unit 42 for a short period in the order of four to six seconds during which the encoding unit is energized and serves to transmit coded signals to the central station 12. In addition to the foregoing, each of the fire alarm boxes 1 through N includes circuit means including a power supply circuit 46 for supplying necessary power to operate the time delay unit 44, the encoding unit 42, as well as transmitter 38. A normally closed shorting switch S is connected in series with the metallic series loop circuit 14 for normally rendering the components within the box inactive.

Having briefly described each of the various components within each fire alarm box 1 through N, attention is now directed toward a deailed description thereof.

POWER SUPPLY CIRCUIT

The power supply circuit 46 is connected across the normally closed shorting switch S via winding 48 of a transformer 50. The power supply circuit 46 includes a steering diode 52 connected in series with the Zener diode 54 across a second steering diode 56, which in turn is connected in parallel with the normally closed switch S via winding 48 of transformer 50. With direct current flow in the metallic circuit 14 of the fire alarm system in the direction indicated by the arrows *i*, one side of switch S when opened may be considered as a positive terminal *a* and the other side may be considered as a negative terminal *b*. Accordingly, for current flow in the direction indicated by arrows *i* the anodes of Zener diode 54 and steering diode 56 are connected directly with the negative terminal *b* and the anode of steering diode 52 and the cathode of steering diode 56 are connected to the positive terminal *a* via winding 48 of transformer 50. In this manner, with switch S opened, the Zener diode 54 will be rendered reverse biased whereby a positive potential will exist at terminal *c*, i.e., the junction of the cathodes of stering diode 52 and Zener diode 54, with respect to the negative terminal *b*. With current flow in the order of 100 milliamperes, as in the case of a fire alarm system, this potential may be in the order of 5.1 volts.

The time delay circuit 44 includes a unijunction transistor 58 having its base B1 connected with the negative terminal *b* via a current limiting resistor 60 and its base B2 connected to the positive terminal *a* via current limiting resistor 62 and winding 48 of transformer 50. The emitter 64 of unijunction transistor 58 is connected to the junction of a current limiting resistor 66 and a capacitor 68, which are in turn connected together in series across the normally closed switch S via winding 48 of transformer 50. A load resistor 70 is connected in parallel with current limiting resistor 60 via a steering diode 72. The load resistor 70 serves to provide a positive potential with respect to the negative terminal *b* at the gate 74 of a silicon controlled rectifier SCR 76. The silicon controlled rectifier SCR 76 is connected across the normally closed switch S, as illustrated in FIGURE 2, with its cathode 78 connected directly with the negative terminal *b* and its anode 80 connected with the positive terminal *a* via a current limiting resistor 82 and the winding 48 of transformer 50. The junction of SCR 76 and current limiting resistor 82 is connected with the base 84 of an on-off switching means such as N-P-N transistor 86 via a current limiting resistor 88. Transistor 86 has its emitter 90 connected with the negative terminal *b* via a steering diode 92 poled as shown in FIGURE 2.

The encoding unit 42 in each of the fire alarm boxes 1 through N includes a pair of resonant reed, solid state oscillators 96, 98 each serving to develop an output frequency in the range from 250 to 450 cycles per second. The output frequencies developed by the two oscillators 96, 98 are different frequencies and, accordingly, the output of oscillator 96 may be designated as frequency signal $f_1$ and the output signal developed by oscillator 98 may be designated as frequency signal $f_2$. Adjustment of positive feedback for the oscillators 96, 98 is controlled by variable resistors 100, 102, respectively, connected to oscillators 96, 98. The output frequency signals developed by oscillators 96, 98 are fed to a dual channel buffer amplifier, including single stage emitter follower amplifiers 104, 106 connected to the output circuits of oscillators 96, 98, respectively. The use of emitter follower circuitry for amplifiers 104, 106 serves the purpose of presenting a high impedance input to each of the two oscillators 96, 98. The output circuits of amplifiers 104, 106 are connected to variable resistors 108, 110 respectively, each of which exhibits a great resistance value compared to the low output impedance of its associated emitter follower circuitry amplifier. The variable resistor 108, 110 performs two functions: (1) they control the amplitude of the outgoing oscillator signal; and (2) serve to isolate oscillators 96, 98 from each other. Further, the variable resistors 108, 110 serve as gain controls in the output circuit of each of the amplifiers 104, 106 for adjusting the magnitude of the output signals at desired levels which are normally dictated by the transmission line and system attenuation characteristics. The resistors 108, 110 are connected together at 112 whereby the output frequency signals $f_1$ and $f_2$ are combined, and fed by means of an encoder output lead 114 to one winding 116 of a transformer 118. Operating and bias power for the oscillators and amplifiers of the encoder unit 42 is obtained from the output side, i.e., terminals 120, 122 of the time delay circuit 44. Output terminal 120 serves as a point of positive potential as it is connected with the positive terminal *a* via winding 48 of transformer 50 and output terminal 122 serves as a point of negative potential with respect to terminal 20 when transistor 86 is conductive via the collector 94 to emitter 90 electrodes of the transistor and steering diode 92 to the negative terminal *b*. As can be seen with reference to FIGURE 2, negative bias potential is obtained from the negative output terminal 122 for providing appropriate bias potential for oscillators 96, 98, as well as the amplifiers 104, 106. Further, operating positive potential is obtained from the positive output terminal 120 for providing suitable operating power for oscillators 96, 98 as well as the amplifiers 104, 106.

The output circuit of the voice transmitter 38 is connected to the high pass filter 121 which presents a high impedance to all frequencies below 600 cycles per second and passes all frequencies above 600 cycles per second. The output circuit of high pass filter 121 is in turn connected across a loading resistor 123, as well as across the winding 116 of transformer 118. A blocking capacitor 124 is incorporated in the filter 121 and serves to block low frequency signals thereby preventing the output signals of oscillators 96, 98 from being unduly attenuated by the normally low impedance presented at the output circuit of filter 121. The other side of transformer 118, i.e., winding 126, couples the output circuit of filter 121, as well as the output circuit 114 of the encoding unit 42 with a common power amplifier 128. The amplifier 128 may be of conventional design but is preferably a solid state, push-pull power amplifier. Bias potential for the base emitter circuitry of amplifier 128 is obtained from output terminal *c* of the power supply circuit 46 via a mid-tap 130 on the winding 126 of transformer 118. Negative bias potential for the amplifier 128 is obtained from the negative terminal *b*. The operating potential for amplifier 128 is obtained from output terminal 120 of the time delay circuit 44. The amplifier 128 serves a dual function in that it provides power amplification for both the voice transmitter 38, as well as for the encoding circuit 42. The output circuit of amplifier 128 is coupled to the fire alarm metallic circuit 14 via windings 49, 48 of the transformer 50.

A filter 130 is connected across winding 48 of transformer 50 and has its output circuit connected across the input circuit of the telephone receiver 40. Filter 130 is a high pass filter presenting a high impedance to frequencies below 600 cycles per second and passing to the receiver 40 only those signals of a frequency in excess of 600 cycles per second.

CENTRAL STATION EQUIPMENT

Figure 3:
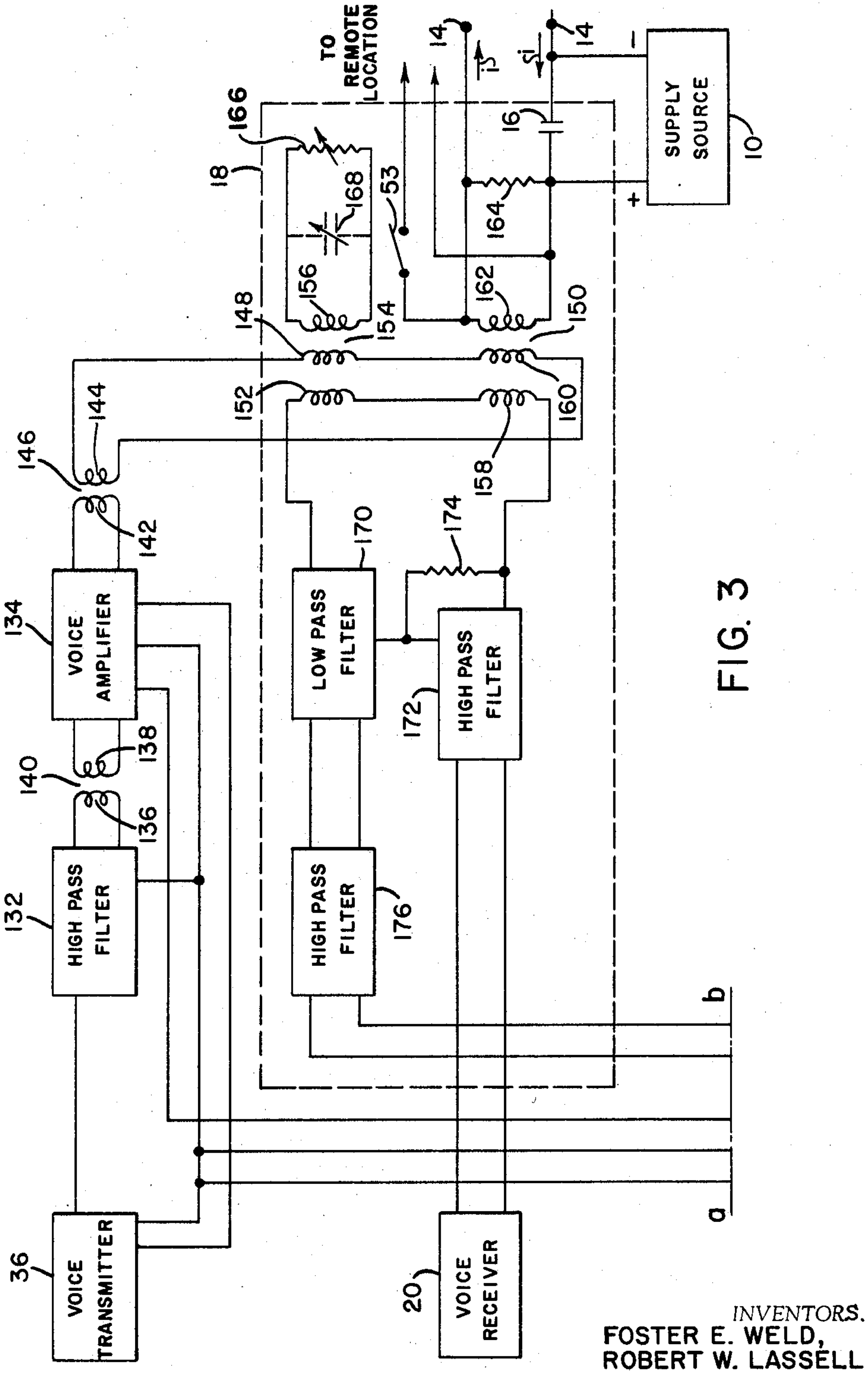
FIGURES 3 and 3A are combined schematic block diagrams illustrating the circuitry at the central station; and, FIGURE 4 is a schematic circuit diagram illustrating an AND circuit according to the present invention.

The various equipment located at the central station 12 together with the central office power supply 10 described in general terms with respect to FIGURE 1, will hereinafter be described in greater detail with reference to the combined schematic block diagram illustrated in FIGURE 3.

The voice transmitter 36 at the central station 12 has its output circuit coupled to a high pass filter 132 which presents a high impedance to signal frequencies below 600 cycles per second and serves to pass frequencies above 600 cycles per second. The output circuit of the high pass filter 132 is coupled across the input circuit of a voice amplifier 134 via windings 136, 138 of transformer 140. Amplifier 134 may be of conventional design but preferably is of solid state circuitry taking the form of a push-pull class A amplifier. The output circuit of the amplifier 134 is in turn coupled to the separator circuitry 18 via windings 142, 144 of a transformer 146.

Figure 3A:
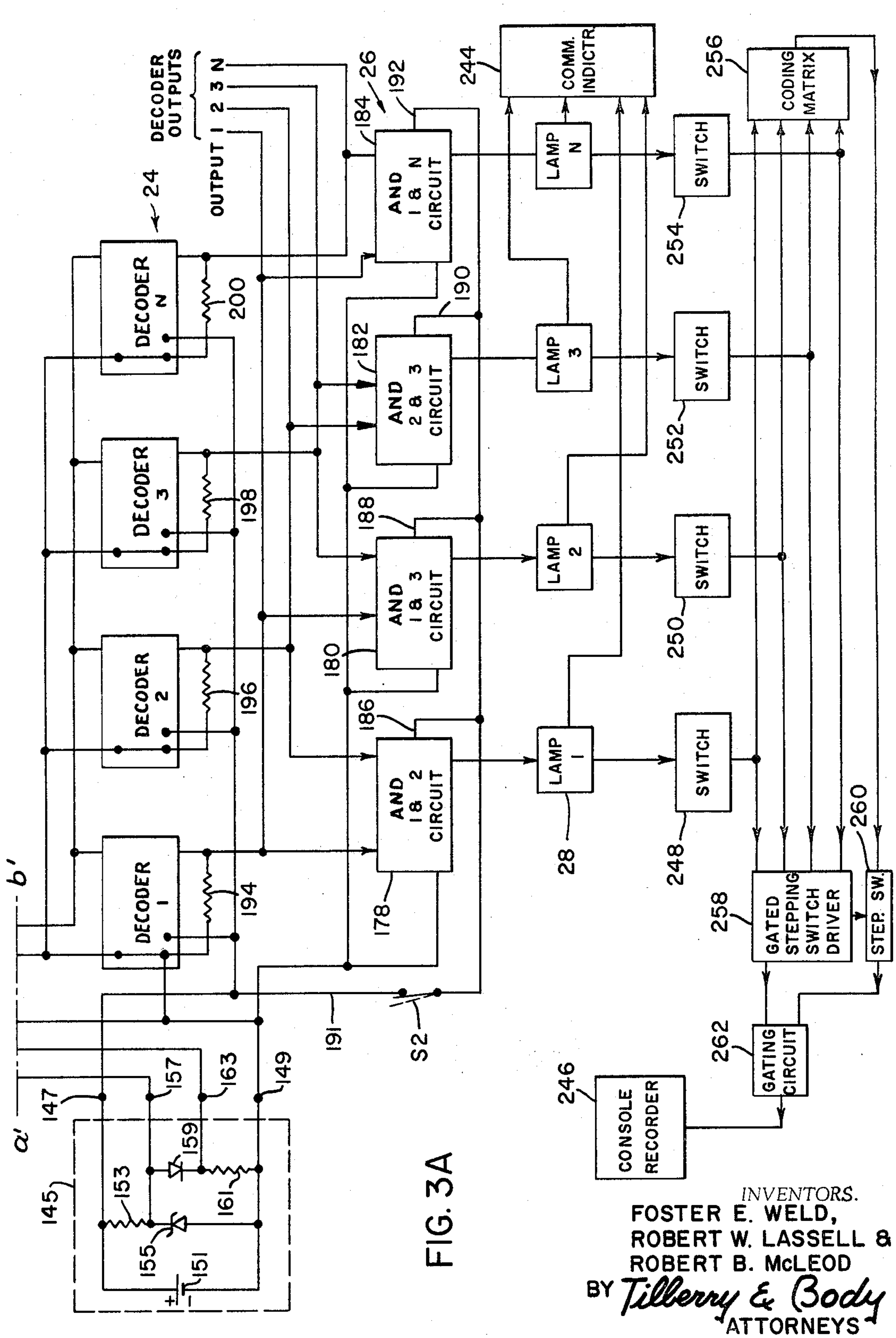

A power supply circuit 145 is included at the central station 12 and serves to provide bias and operating potentials to the voice transmitter circuitry, as well as circuitry to be described hereinafter. The power supply circuit 145 includes a direct current voltage supply source connected between output terminals 147, 149 of the power supply circuit. The supply source may take the form of battery 151, which preferably is of 24 volts positive potential at terminal 147. A resistor 153 and a Zener diode 155, poled as shown in FIGURE 3A, are connected together in series across battery 151 so that the Zener diode is rendered reverse biased and serves to provide a regulated voltage potential at output terminal 157 taken from the junction of the resistor 153 and the cathode of the Zener diode 155. A steering diode 159, poled as illustrated in FIGURE 3A, is connected in series with another resistor 161 across the Zener diode 155 so that a third potential with respect to terminal 157 is obtained at output terminal 163 taken from the junction of the resistor 161 and the cathode of diode 159. As illustrated in FIGURE 3A, bias and operating potentials are obtained from terminals 157 and 163 and suitably applied to the voice transmitter 36, as well as filter 132 and the voice amplifier 134.

The signal separation circuit 18 serves the function of separating incoming box identifying signals from incoming voice frequency signals and channeling each to its proper destination, as well as channeling the outgoing voice frequency signals to the fire alarm metallic circuit 14 while inhibiting such signals from reaching either the voice receiver 20 or the input of the decoder circuitry 24. Signal separation circuit 18 includes a pair of transformers 148 and 150, each having three windings of one to one turn ratio, i.e., transformer 148 has windings 152, 154 and 156 and transformer 150 has windings 158, 160 and 162. Windings 154 and 160 are connected together in series across winding 144 on transformer 146. Windings 152, 158 are connected together in series opposition so that, as is well known in the art, if equal voltages are developed across the two windings as in the case if the load seen by each transformer 148 and 150 are equal in magnitude and phase, the voltages will cancel. To accomplish this effect a loading resistor 164 is connected across winding 162 on transformer 150 and a variable resistor 166 is connected across winding 156 on transformer 148 for purposes of balancing the combination load of resistor 164 across winding 162 on transformer 150, as well as any shunting line resistance present in the metallic circuit 14. Further, a variable balancing capacitor 168 is connected across winding 156 on transformer 148 for purposes of balancing the effective line capacity shunting the winding 162 on transformer 150. The signal separation circuit 18 also serves to bypass other fire alarm equipment associated with the 100 milliampere direct current voltage supply source 10 by virtue of the bypass capacitor 16 connected across the output of the supply 10. With the foregoing circuitry, output voice frequencies from the voice transmitter 36 will result in equal and opposite voltages induced across windings 152, 158, which will cancel and, hence, not reach either the decoder inputs to the decoder circuitry 24 or the input of voice receiver 20. However, the voice frequency output signal, as amplified by amplifier 134, will be developed across output winding 162 of transformer 150 and thereby impressed on the fire alarm metallic circuit 14.

A pair of filters 170, 172 are connected together across windings 152, 158 of transformer 150. A resistor 174 is connected in shunt across filter 172 from the junction of filters 170, 172 to the winding 158. Filter 172 is a high pass filter presenting a high impedance to signals of a frequency below 600 cycles per second and passing only those frequencies above 600 cycles per second. The output of filter 172 is coupled across the input of voice receiver 20. Filter 170 is a low pass filter which presents a high impedance to signals of a frequency in excess of 450 cycles per second, and passes only those signals of a frequency below 450 cycles per second. The output circuit of filter 170 is coupled to the input circuit of a filter 176. Filter 176 is a high pass filter presenting a high impedance to frequencies below 250 cycles per second and passing those signal frequencies above 250 cycles per second. Therefore, filters 170 and 176 serve as a band pass filter for passing signals in the frequency range of 250 cycles per second to 450 cycles per second. This is the frequency range of the output signals appearing in the output circuit 114 of the encoding unit 42 located within each of the local fire alarm boxes 1 through N.

The output circuit of filter 176 is applied across the input terminals of each decoding circuit 1 through N in the decoding unit 24 located at the central station 12. Each of the decoders 1 through N is a frequency selector, preferably of solid state circuitry, which serves to produce a DC voltage output signal only when fed by an AC signal of a selected frequency. Thus, for example, the decoders may take the form of resonant reed relays preceded by several stages of clipper amplifiers and for each oscillator 96, 98 in the local traffic boxes 1 through N, there will be one decoder circuit which will respond to that and only that frequency with a maximum band width of plus or minus 2% and a minimum band width of plus or minus .25%. Thus, since two oscillators 96, 98 are utilized in each of the local fire alarm boxes the composite output signal developed at the output circuit 114 of each of the encoding units 42 will activate two decoder circuits 1 through N in the decoder unit 24 at the central station 12. The outputs of the decoder circuits 1 through N, i.e., outputs 1 through N, represent DC voltages and are fed to several AND circuits which comprise the logic circuit 26, with AND circuits 178, 180, 182 and 184 only being illustrated in FIGURE 3A. The total number of decoder circuits N utilized may be found from the following expression:

$$\text{AND circuits} = \frac{N(N-1)}{2}$$

where the number of "AND circuits" is equal to the number of local fire alarm boxes in the system.

Two decoder outputs are fed to the input circuit of each AND circuit. Any particular decoder output may be fed commonly to several of the AND circuits, but any particular combination of two decoder outputs is fed to only one AND circuit. Thus, for example, as illustrated in FIGURE 3A, AND circuit 178 has inputs received from decoders 1 and 2, AND circuit 180 has inputs received from decoders 1 and 3, AND circuit 182 has inputs received from decoders 2 and 3, and AND circuit 184 has inputs received from decoders 1 and N.

Figure 4:
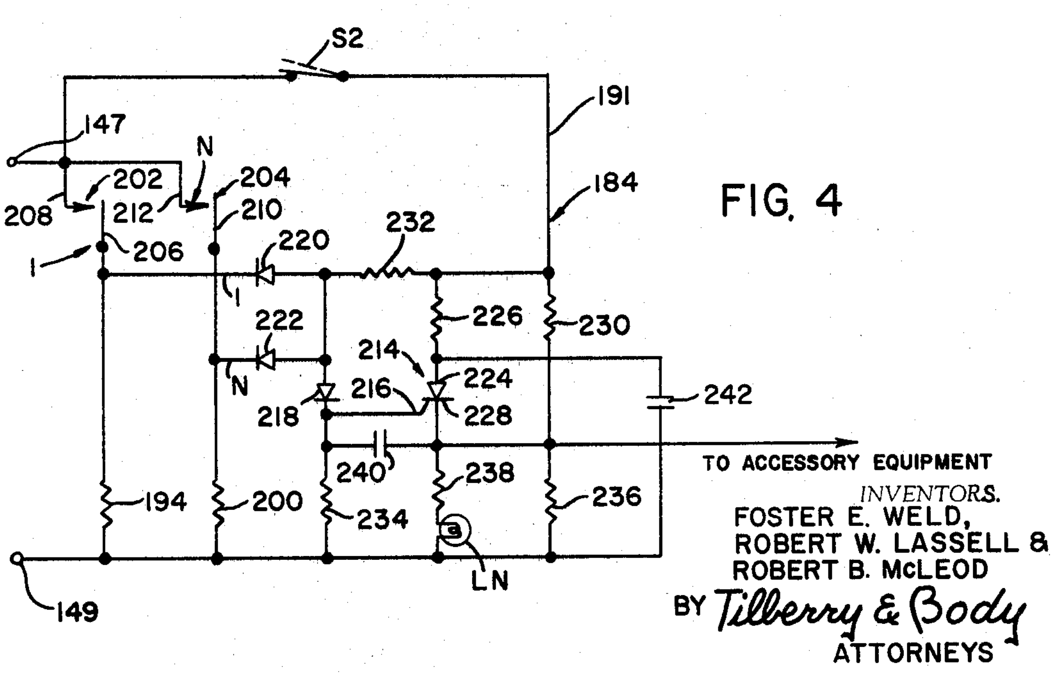

A reset circuit 191 is provided for simultaneously resetting all of the AND circuits associated with the logic circuitry 26 and as illustrated in FIGURE 3A includes a normally closed switch S2 connected to the output terminal 147 of the power supply source 145 and to input terminals 186, 188, 190 and 192 of the AND circuits 178, 180, 182 and 184, respectively. The reset circuit 191 together with its interconnection with each of the AND circuits may be more clearly understood with reference to FIGURE 4 which is a schematic diagram of AND circuit 184 and partially illustrating decoding circuits 1 and N. It will be noted with reference to FIGURE 3A that resistors 194, 196, 198 and 200 are connected between terminal 149 of power source 145 and the output circuit of decoding units 1 through N. These resistors as illustrated in FIGURE 4 also serve as a portion of the AND circuits 178, 180, 182 and 184. In FIGURE 4 the decoding units 1 and N are illustrated for schematic purposes as comprising switches 202 and 204. Switch 202 is illustrated as comprising a movable contact 206 connected to terminal 149 via resistor 194 and a stationary contact 208 connected with output terminal 147 of the power supply circuit 145. Similarly, switch 204 is illustrated as comprising a movable contact 210 connected to terminal 149 via resistor 200 and a stationary contact 212 connected to the output terminal 147 of the power supply circuit 145. The AND circuit 184 includes a silicon controlled rectifier SCR 214 having its gate 216 connected through the cathode to anode circuit of a steering diode 218 to the junction of resistor 194 and movable armature 206 via the anode to cathode circuit of a steering diode 220, and to the junction of movable armature 210 and resistor 200 via the anode to cathode circuit of a steering diode 222. The reset circuit 191 is connected from the output terminal 147 of the power supply circuit 145 via reset switch S2 to the anode 224 of SCR 214 via a current limiting resistor 226 and to the cathode 228 of the SCR 214 via a current limiting resistor 230. The anode 224 of SCR 214 is also connected with the junction of the anodes of steering diodes 218, 220 and 222 via resistor 226 and a resistor 232. A resistor 234 is connected between terminal 149 and the gate 216 of silicon controlled rectifier SCR 214 which resistor is of greater resistance than either of the resistors 194, 196, 198 and 200, which are each of equal resistance and further which resistance is of smaller resistance than resistor 232, the purpose of which will be described in greater detail hereinafter with reference to the description of operation. The cathode 228 of SCR 214 is also connected to terminal 149 via a loading resistor 236 connected across a series circuit including lamp LN and a current limiting resistor 238. A capacitor 240 is connected between the gate 216 and the cathode 228 of SCR 214 for purposes of protecting against radio frequency triggering effects. Further, another capacitor 242 is connected between terminal 149 and the anode 224 of SCR 214 for purposes of protecting the circuit against rate effects. Rate effect is described on pages 26 and 27 of the General Electric SCR Manual, second edition. It essentially relates to reducing rise of voltage as applied between the anode and cathode of a SCR.

The indicator portion 28 at the central station 12 includes an individual visual box identifier for each of the local fire alarm boxes 1 through N for displaying an indication as to which particular box sent two unique frequencies which activated a particular pair of decoders which in turn energized a particular indicator. These indicators take the form of lamps L1 through LN, as illustrated in FIGURE 3A, with lamp L1 being present in the output circuit of AND circuit 178, L2 being present in the output circuit of AND circuit 180, lamp L3 being present in the output circuit of AND circuit 182, and the lamp LN being present in the output circuit of AND circuit 184. With reference to FIGURE 4, it will be noted that each of the lamps L1 through LN is connected to its associated AND circuit in the manner in which lamp LN is connected, as illustrated in FIGURE 4. Each of the lamps L1 through LN is connected with a common indicator 244 which includes both an audio alarm device and a suitable lamp whereby upon any of the lamps L1 through LN being energized, so also will the common indicator 244.

If it is desired to provide a permanent recording as to which of the local fire alarm boxes 1 through N placed a call to the central station 12, a suitable console recorder 246 may be connected to the output circuits of lamps L1 through LN. This additional circuitry includes a plurality of triggered switches 248, 250, 252 and 254, respectively, connected to the output circuits of lamps L1 through LN. The output circuits of the triggered switches 248 through 254 are in turn connected to a coding matrix 256, as well as to a gated stepping switch and driver 258. The output circuit of the coding matrix 256, as well as the output circuit of the gated stepping switch and driver 258, are connected to a suitable stepping switch device 260. Further, an AND gating circuit 262 is connected to outputs taken from the stepping switch device 260, as well as the gated stepping switch and driver 258, whereupon if inputs are received from both then an output signal will be transmitted to the input of the console recorder 246.

OPERATION OF EACH INDIVIDUAL FIRE ALARM BOX

In operation of the combined telephone-telegraphy system according to the present invention, a coded distinctive signal representative of a particular fire alarm box is transmitted and relayed over the single metallic circuit 14 upon opening the normally closed switch S (see FIGURE 2). Preferably, and within the contemplation of the present invention, the normally closed switch S represents a telephone handset cradle and that the handset incorporates both the transmitter 38, as well as the receiver 40. The person placing the call merely removes the handset from the cradle and the resiliently biased switch S opens, as represented by the dotted lines in FIGURE 2. With switch S in its open position the short circuit shunt between terminals *a* and *b* is removed whereby current may flow from the positive terminal *a* through the winding 48 of transformer 50 to the power supply circuit 46 so that the Zener diode 54 is rendered reverse biased by virtue of the direction of current flow and the configuration of the steering diodes 52, 56. Accordingly, suitable bias supply is obtained at terminal *c* of the power supply 46 for purposes of supplying base emitter bias for the transistor power amplifier 128 via mid-tap 130 on winding 126 of transformer 118. Current will also flow from positive terminal *a* through the winding 48 of transformer 50 to the biasing resistors 82, 88, the base 84 to emitter 90 of transistor 86, steering diode 92 to the negative terminal *b* thereby forward biasing transistor 86. In this manner, transistor 86 is heavily biased conductive and essentially a short circuit is obtained between its output terminal 122 and the negative terminal *b*. Accordingly, a potential difference will exist between the output terminals 120 and 122 of the time delay circuit 44 for purposes of providing operating and biasing potential to the oscillators 96, 98 and their associated amplifiers 104, 106, respectively. Oscillator 96 will develop an output frequency signal $f_1$, which is suitably amplified by the amplifier 104 and applied to the output circuit 114. Similarly, oscillator 98 will develop an output frequency signal $f_2$, which is suitably amplified by amplifier 106, and, likewise, applied to the output circuit 114. The composite output signal present in the output circuit 114 is a complex wave form being a mixture of amplified output frequency signals $f_1$, $f_2$ and is applied to the input of power amplifier 128 via transformer 118. The coded frequency signal developed by the encoder unit 42 is thus amplified by the power amplifier 128 and coupled to the fire alarm metallic circuit 14 via the coupling transformer 50 and thence to the central station 12. The direction or arrow *i* in FIGURE 2 indicates the direction of the 100 milliampere direct current that normally flows through the metallic circuit (see FIGURE 1). The coded frequency signal impressed across transformer winding 48, in FIGURE 2, is an alternating current voltage and therefore will alternate in direction.

During the period in which the encoder unit 42 is transmitting a coded frequency signal, timing capacitor 68 in the time delay circuit 44 is charged through its associated timing resistor 66. When the capacitor 68 is sufficiently charged that the potential existing between the negative terminal *b* and emitter 64 of unijunction transistor 58 reaches the characteristic peak point voltage of the unijunction transistor, then the emitter 64 will become forward biased and the dynamic resistance between the emitter 64 and base B1 will drop to an exceedingly small value. The capacitor 68 will then discharge through the emitter 64, base B1 of unijunction transistor 58 through the load resistor 60. The potential existing across the load resistor 60 will be coupled through the steering diode 72 and appear across a second loading resistor 70. The potential eixsting across loading resistor 70 serves as a positive gating potential of sufficient magnitude to forward bias the silicon controlled rectifier SCR 76 when applied to the gate 74. Accordingly, the silicon controlled rectifier SCR 76 becomes conductive and essentially short circuits the base to emitter electrodes of transistor 86. In this manner, transistor 86 becomes nonconductive and the potential existing between the output terminals 120, 122 of the time delay circuit 44 no longer exists. Thus, operating and bias potential for the oscillators 96, 98 and their asociated amplifiers 104, 106, respectively, is removed whereby the encoding unit 42 ceases to transmit a coded frequency signal. Accordingly, the unijunction transistor 58 and the SCR 76 may be defined as control means for turning transistor 86 off when the magnitude of energy stored by the energy storage means, i.e., capacitor 68, reaches a predetermined value. As can be appreciated, the time involved during which the encoding unit 42 transmits a coded signal to the completion thereof, is controlled by the RC timing circuit comprising resistor 66 and capacitor 68 of the time delay circuit 44. Preferably, resistor 66 and capacitor 68 are choosen so that the encoding unit 42 transmits a coded frequency signal for a period of four to six seconds. The user of the telephone handset at the local fire alarm box placing the call will hear a tone signal for the duration of the transmitting period of encoding unit 42, at the completion of which the user may commence voice communications with the voice communication system at the central station 12.

Voice communications with the central station 12 are provided by the voice frequency transmitter 38, which transmits voice frequency signals via the high pass filter 121 and coupling transformer 118 through the power amplifier 128 to the metallic fire alarm circuit 14 via a second coupling transformer 50. The user of the telephone communication system at the local fire alarm box receives voice communications by virtue of the voice receiver 40 connected across winding 48 of transformer 50 via the high pass filter 130.

OPERATION OF THE CENTRAL STATION EQUIPMENT

In the operation of the equipment at the central station 12 coded box identifying frequency signals are received over the metallic interconnecting circuit 14 by the signal separator circuitry 18 as the signals are applied across winding 162 of transformer 150. Since all of the windings, i.e., 158, 160, 162 on the transformer 150 are of one to one turn ratio, equal voltages are developed across windings 160, 158. Since winding 154 on transformer 148 is in series with winding 160 on transformer 150, the voltage induced across winding 160 will cause sufficient current flow through winding 154 to develop a voltage drop across winding 154. Since the windings 152, 154, 156 on transformer 148 are of one to one turn ratio, an equal voltage will also be developed across winding 152, which due to the winding polarities will serve to aid the voltage developed across 158 on transformer 150.

To simplify the explanation, place dots on the transformers to indicate polarity; specifically place dots at the top of windings 158, 160 and 162 of transformer 150 and also at the top of windings 148 and 156 of transformer 154. Place a dot at the bottom of winding 152 of transformer 154. The dot signifies that if a voltage is impressed across a winding of the transformer of such polarity that the end of the winding with the dot is positive with respect to the other end; all other windings on the same transformer core will be polarized likewise. Therefore, if winding 162 of transformer 150 is polarized with a signal from the line, windings 160 and 158 will be polarized the same. Since winding 148 of transformer 154 is serially connected and acts as a load along with the reflected impedance of transformer 146 to the inducted source voltage of winding 160 of transformer 150, the polarity of the voltage in winding 148 of transformer 150 will be opposite that of winding 158 of transformer 154. This means the dot end of winding 148 as well as 152 of transformer 154 will be negative if the dot winding of 160 of transformer 150 is positive. Therefore, winding 152 of transformer 154 and winding 158 of transformer 160 are oppositely polarized; but since they are connected in series opposition, the voltages will aid. Since the input impedance of the high pass filter 172 will be high with respect to the low frequency (250 to 450 cycles per second) of the coded voice frequency signal, the resistor 174 will act as the effective loading resistance and the effective load presented to winding 158 of transformer 150 will be the series load of the effective load on winding 152 of transformer 148, and the input impedance of the 450 cycles per second low pass frequency filter 170 and the loading resistor 174. Any portion of the coded frequency signal developed across the 600 cycle per second high pass filter 172 will be dissipated by the filter as it does not pass these low frequency signals, whereas that portion of the coded frequency developed across the low pass 450 cycles per second filter will readily be passed therethrough. The output signals appearing on the output circuit of filter 170 are in turn directly coupled to the 250 cycle per second high pass filter 176, which serves to reject all frequencies below 250 cycles and pass all frequencies thereabove. In this manner, any noise pick-up signal, such as 60, 120 or 180 cycles per second, will not be passed. Thus, it is seen that filters 170 and 176 serve as a band pass filtering device for purposes of passing coded signal box identifying frequency signals which are in the range of 250 to 450 cycles per second. The output signals developed across the output of filter 176 are thence fed to the input circuits of decoder units 1 through N of the decoder circuitry 24. As stated hereinbefore, the decoders 1 through N are each resonant reed relays preceded by several stages of clipper amplifiers thereby rendering the decoders sensitive to a very narrow frequency range and more specifically they are matched to the resonant reed oscillators found in the encoder units 42 at the various local fire alarm boxes. The number of decoders will depend on the number of fire alarm bxes utilized in the system and for each frequency $f_1$, $f_2$, etc., used by the fire alarm boxes there will be one decoder which will respond to that particular frequency and provide a DC output voltage on its output circuit which is thereafter fed to the AND circuits within the logic circuitry 26.

Assuming that the particular fire alarm box which is sending a coded complex frequency signal to the central station, includes two encoding oscillators one of which develops a frequency signal $f_1$ and the other develops a frequency signal $f_n$, corresponding respectively to the frequency response characteristics of decoding units 1 and N, then only recoding units 1 and N will have an output signal present at their output terminals. With reference to FIGURE 3A, it will be noted that the only AND circuit that is responsive to input signals developed by decoders 1 and N for in turn providing an output signal is AND circuit 184. The operation of AND circuit 184 will be better understood with reference to the schematic diagram shown in FIGURE 4.

Prior to the activation of the decoder circuits 1 and N, i.e., when switches 202, 204 are open as illustrated in FIGURE 4, current will flow from the positive terminal 147 of the voltage supply source 145 through the normally closed reset switch S2, resistor 232 and thence through parallel paths comprising diode 220 and resistor 194 in parallel with diode 222 and resistor 200 to terminal 149. Current will also flow from the positive terminal 147 to terminal 149 through resistor 232, steering diode 218 and resistor 234. As stated hereinbefore, the resistance values of resistor 194, 200, 232 and 234 are such that resistor 234 is of greater resistance than either of the resistors 194 or 200, but less than that of resistor 232 and hence the potential existing at gate 216 of silicon controlled rectifier SCR 124 is somewhat low. Further, the resistors 230, 236 and 238 and lamp LN form a voltage divider whereby the potential existing at the cathode 228 of SCR 214 is at a higher potential than that existing at the gate 216. Consequently, the silicon controlled rectifier SCR 214 is reverse biased and lamp LN will not be energized, i.e., the value of the resistance 230 is sufficiently high that current flow from the positive terminal 147 to terminal 149 through resistor 230, resistor 238 and lamp LN will be insufficient to cause lamp LN to glow. The capacitor 242 serves to protect the circuit against rate effects and the capacitor 240 serves to protect the circuit against radio frequency triggering. However, when the two decoders 1 and N are energized, i.e., with switches 204 and 206 closed, current will flow therethrough from the positive terminal 147 and sufficient potentials will be developed across resistors 194, 200 so that the diodes 220, 222 will be rendered reverse biased. Accordingly, the potential existing at gate 216 of silicon controlled rectifier SCR 214 will assume a higher value determined by the voltage divider circuit now consisting of resistor 232, diode 218 and resistor 234. This potential will be sufficient to forward bias the SCR 214, which will then conduct and shunt the resistor 230 (i.e., resistor 226 is of smaller resistance than resistor 230). The current flow from the positive terminal 147 through the reset circuit 191, resistor 226, the anode to cathode circuit of SCR 214, resistor 238 and lamp LN to terminal 149 will be of sufficient magnitude to cause lamp LN to glow brightly. The fact that lamp LN glows brightly indicates to the observer at the central station 12 that the particular fire alarm box which produces a complex output frequency signal made up of frequency signals $f_1$ and $f_n$ is placing a call. The observer at the central station at this time, or after a sufficient period to permit the console recorder 246 to record the particular fire alarm box which has been identified, may reset all of the AND circuits and the logic circuitry 26 by merely opening the normally closed reset switch S2, thereby removing current from the SCR 214 and unlatching it. It will be noted with reference to FIGURE 3A that the reset switch S2 in the reset circuit 191 is common to all of the AND circuits and, hence, all of the AND circuits will be reset upon opening of switch S2.

In addition to providing visual indication that a particular fire alarm box has placed a call, each of the visual box identifier lamps L1 through LN, produces an output signal which is fed to a common audio and visual monitor circuit 244. Thus, the actuation of any of the lamp circuits L1 through LN effectively turns on the monitor 244 to sound a buzzer and/or a common lamp. In addition to the foregoing outputs, each of the visual box indicator lamps 1 through LN also provides an output signal which is fed to triggered circuits 248 through 254, respectively. The output of each triggered switch circuit 248 to 254 is in turn fed to both a coding matrix circuit 256 and a gated stepping switch and recorder driver 258. A suitable stepping switch 260 is connected to the output circuits of the coding matrix device 256 and the gated stepping switch and driver circuit 258 for purposes of providing a gating signal to a suitable gate 262. The gate 262 in turn provides an output signal to the console recorder 246 only in the absence of an input signal from the stepping switch 260. In the event of no input signal from the stepping switch 260 the recorder 246 would print eleven marks. By the use of the coding matrix 256 any one or any number of the last ten marks can be eliminated, thus forming a digit which is an indication that a particular fire alarm box has placed a call.

Voice communications with the calling fire alarm box are provided at the central station by means of a telephone transmitter 36 and the voice receiver 20. The output voice frequency signals developed by the transmitter 36 are coupled to a voice amplifier 134 via a high pass filter 132 and transformer 140. The amplified voice frequency signals, which due to the filter action of high pass filter 132 are above 600 cycles per second, are coupled across transformer 146 and supplied to the metallic fire alarm interconnecting circuit 14 by way of winding 162 on transformer 150. Incoming voice frequency signals from the calling fire alarm box are developed across winding 162 of transformer 150 and since all of the windings on transformer 150 have a one to one turn ratio, equal voltages are developed across windings 158 and 160 equal to that across winding 162. The load presented to the winding 160 on transformer 150 is a series load consisting of the effective load of transformers 148 and 146. However, the effective load of transformer 146 is essentially infinite compared to that of transformer 148 since the former represents the impedance reflection of the push-pull transistor amplifier 134. Thus, in essence, current flow through windings 154 and 160, transformers 148, 150, respectively, is limited by the magnetizing inductance of transformer 146 and most of the voltage developed across winding 160 on transformer 150 will be impressed across transformer 146 and very little across transformer 148. The load presented to winding 158 on transformer 150 is the effective load presented to winding 152 on transformer 148 in series with the input impedances of filters 170 and 172 shunted by the loading resistor 174. Thus, the loading at voice frequencies on winding 152 of transformer 148 is effectively the value of resistance 166 and the input impedance of filter 170, which are low compared with the input impedance of filter 172 shunted by the loading resistor 174. Thus, a good portion of the incoming voice frequency signal is developed across the high pass filter 172. Since the incoming voice frequency signal contains no frequencies below 600 cycles per second, it is seen that the portion of the voice frequency signal which is developed across the low pass 450 cycles per second filter 170 is dissipated therein and will not reach the decoders 1 through N of the decoder circuitry 24. Accordingly, the voice frequency signals which are developed across the 600 cycles per second high pass filter 172 are readily passed through the filter to the voice receiver 20.

The fire alarm boxes, with the disclosed circuitry employed, will send an alarm signal as long as the D.C. line current does not drop below approximately 40 ma. To determine the number of boxes which may operate simultaneously it is necessary to know the total line resistance and the source voltage as well as the total voltage drop across each box. In the preferred application of this system, the supply voltage is 110 v., the maximum line resistance is 500 ohms, and the voltage drop across each box is 6 volts maximum (constant regardless of current). The formula for calculating the maximum number of boxes which may send in an alarm simultaneously is:

$$\frac{V_s-N(6)}{R_L}=40(10^{-3})$$

or $$\frac{V_s-40R_L(10^{-3})}{6}=N$$

where $V_s$=source voltage
$N$=number of boxes
$R_L$=line resistance in ohms

With 110 v.=$V_s$ and $R_L$=500 ohms $$N=\frac{110-(40)(500)(10^{-3})}{6}=15 \text{ boxes}$$

The invention has been described in connection with a particular preferred embodiment, but is not to be limited to same. Various modifications may be made without departing from the scope and spirit of the present invention as defined by the appended claims.

We claim:

1. A combined telephone-telegraphy system comprising a plurality of local calling boxes and central station communication equipment connected together in a series circuit and adapted to be connected across a power source for maintaining current flow in said series circuit, each said local calling box including voice communication means for transmitting and receiving voice frequency signals to and from said central station equipment as well as electrically powered electronic telegraphy means for electrically transmitting coded box identifying tone frequency signals to said central station equipment, each said local calling box including circuit means for providing operating electrical power for said local calling box from said current flow in said series circuit, said central station equipment including voice communication means for transmitting and receiving voice frequency signals to and from said local calling boxes as well as calling box identifying means responsive to said coded box identifying tone frequency signals for identifying the particular calling box transmitting said coded box identifying signals, said circuit means includes a power supply circuit for providing bias potentials derived from said current flow in said series circuit for said voice communication means and said telegraphy means at said box.

2. A combined telephone-telegraphy system as set forth in claim 1 including normally closed switching means for each box shunting said circuit means at said box thereby rendering said circuit means nonresponsive to current flow in said series circuit until said switching means is opened.

3. A combined telephone-telegraphy system as set forth in claim 1 wherein said telegraphy means at each local calling box includes oscillator means for developing a coded frequency signal representative of its associated calling box.

4. A combined telephone-telegraphy system as set forth in claim 3 wherein said oscillator means includes a pair of oscillators each serving to develop a signal of a different frequency from that of the other oscillator.

5. A combined telephone-telegraphy system as set forth in claim 1 wherein said central station equipment includes signal separation circuit means for separating received voice frequency signals from received coded box identifying frequency signals and respectively coupling said signals to said central station voice communication means and said calling box identifying means.

6. A combined telephone-telegraphy system comprising a plurality of local calling boxes and central station communication equipment connected together in a series circuit and adapted to be connected across a power source for maintaining current flow in said series circuit, each said local calling box including voice communication means for transmitting and receiving voice frequency signals to and from said central station equipment as well as telegraphy means for transmitting coded box identifying frequency signals to said central station equipment, each said local calling box including circuit means for providing operating power for said local calling box from said current flow in said series circuit, said central station equipment including voice communication means for transmitting and receiving voice frequency signals to and from said local calling boxes as well as calling box identifying means responsive to said coded box identifying frequency signals for identifying the particular calling box transmitting said coded box identifying signals, normally closed switching means for each box shunting said circuit means at said box thereby rendering said circuit means nonresponsive to current flow in said series circuit until said switching means is opened, said telegraphy means at each local calling box includes oscillator means for developing a coded frequency signal representative of its associated calling box, and time delay circuit means for de-activating said oscillator means after a predetermined time subsequent to the opening of said normally closed switching means whereby said coded frequency signals are transmitted for only a predetermined period.

7. A combined telephone-telegraphy system comprising a plurality of local calling boxes and central station communication equipment connected together in a series circuit and adapted to be connected across a power source for maintaining current flow in said series circuit, each said local calling box including voice communication means for transmitting and receiving voice frequency signals to and from said central station equipment as well as telegraphy means for transmitting coded box identifying frequency signals to said central station equipment, each said local calling box including circuit means for providing operating power for said local calling box from said current flow in said series circuit, said central station equipment including voice communication means for transmitting and receiving voice frequency signals to and from said local calling boxes as well as calling box identifying means responsive to said coded box identifying frequency signals for identifying the particular calling box transmitting said coded box identifying signals, and common power amplifying means for each said calling box for amplifying the output of said voice communication transmitting means and the output of said telegraphy means, and coupling circuit means coupling the output of said common power amplifying means with said series circuit.

8. A combined telephone-telegraphy system as set forth in claim 7 including filtering means interposed between the output of said voice communication transmitting means and the input of said common power amplifying means for passing voice frequency signals to said common power amplifying means which exceed a predetermined frequency.

9. A combined telephone-telegraphy system as set forth in claim 8 wherein said filtering means includes a blocking capacitor which serves to prevent coded box identifying frequency signals transmitted by said telegraphy means which are below said predetermined frequency from being unduly attenuated.

10. A combined telephone-telegraphy system comprising a plurality of local calling boxes and central station communication equipment connected together in a series circuit and adapted to be connected across a power source for maintaining current flow in said series circuit, each said local calling box including voice communication means for transmitting and receiving voice frequency signals to and from said central station equipment as well as telegraphy means for transmitting coded box identifying frequency signals to said central station equipment, each said local calling box including circuit means for providing operating power for said local calling box from said current flow in said series circuit, said central station equipment including voice communication means for transmitting and receiving voice frequency signals to and from said local calling boxes as well as calling box identifying means responsive to said coded box identifying frequency signals for identifying the particular calling box transmitting said coded box identifying signals, said central station equipment includes signal separation circuit means for separating received voice frequency signals from received coded box identifying frequency signals and respectively coupling said signals to said central station voice communication means and said calling box identifying means, and said signal separation circuit means includes high pass voice frequency filter means for passing only received signals of a frequency above a predetermined frequency and band pass filter means for passing only received signals of frequencies within a frequency band below said predetermined frequency, the output of said high pass filter means being coupled with the input of said voice frequency receiving means at said central station and the output of said band pass filter means being coupled with said box identifying means.

11. A combined telephone-telegraphy system as set forth in claim 10 wherein said band pass filter means includes a first low pass filter for passing received signals of frequencies below that of said predetermined frequency and a second high pass filter coupled to the output of said first low pass filter for passing signals of a frequency above a second predetermined frequency, the output of said second high pass filter being coupled to said box identifying means.

12. A combined telephone telegraphy system as set forth in claim 10 wherein said box identifying means includes a plurality of decoder means each responsive to a particular frequency within a frequency range of signals passed by said band pass filter means for providing an output decoder signal.

13. A combined telephone-telegraphy system as set forth in claim 12 wherein said telegraphy means at each said local calling box includes a pair of oscillators each serving to develop a signal of a frequency different than that from the other oscillator as well as from the oscillators in said other local calling boxes, decoding means at said central station for each said oscillator among said plurality of oscillators in said local calling boxes responsive to the frequency of the signal developed by one of said oscillators for providing an output decoder signal.

14. A combined telephone-telegraphy system as set forth in claim 13 including logic circuitry means responsive to various combinations of said output decoder signals for determining which local calling box is transmitting coded box identifying frequency signals.

References Cited

UNITED STATES PATENTS

| | | | |
|---|---|---|---|
| 1,613,802 | 1/1927 | Mollard | 340—288 X |
| 2,101,209 | 12/1937 | Bacon | 340—287 |
| 2,820,098 | 1/1958 | Skogsberg | 179—5 |
| 2,887,535 | 5/1959 | Craddock | 179—5 |

ROBERT L. GRIFFIN, *Primary Examiner.*

W. S. FROMMER, *Assistant Examiner.*